United States Patent [19]

Wickham

[11] Patent Number: 4,715,113

[45] Date of Patent: Dec. 29, 1987

[54] MACHINE COMPONENT INSTALLATION DEVICE

[75] Inventor: John L. Wickham, Glenarm, Md.

[73] Assignee: The J. L. Wickham Company, Inc., Baltimore, Md.

[21] Appl. No.: 881,234

[22] Filed: Jul. 2, 1986

[51] Int. Cl.$^4$ ............... B23P 19/00; B23P 21/00; B65G 59/00

[52] U.S. Cl. ................. 29/792; 29/33 K; 29/35.5; 29/785; 221/121; 198/473.1; 414/125; 414/128; 414/226

[58] Field of Search ............ 29/33 K, 33 P, 35.5, 29/783, 785, 791, 792; 198/473.1; 414/125, 128, 225, 226; 221/121, 122, 222

[56] References Cited

U.S. PATENT DOCUMENTS

| | | | |
|---|---|---|---|
| 3,553,815 | 1/1971 | McElvy | 29/785 X |
| 4,328,908 | 5/1982 | Temming | 414/128 X |
| 4,558,802 | 12/1985 | Molison | 221/222 X |

FOREIGN PATENT DOCUMENTS

778992  11/1980  U.S.S.R. ................. 29/785

Primary Examiner—Howard N. Goldberg
Assistant Examiner—Ronald S. Wallace
Attorney, Agent, or Firm—Cushman, Darby & Cushman

[57] ABSTRACT

A machine component installer for installing bearings, pins, bushings, and the like into a machine casting or similar component includes a reloadable carousel for accepting plural component stacks, a pivotally mounted claw-arm for grasping a bearing presented by the carousel and for swinging the grasped bearing into a pre-installation position, and a press for determining that all components are properly positioned and for pressing the bearing into a bore. The carousel includes a rotatably mounted turntable with guides for accepting plural stacks of bearings. The bearings drop, on a one-by-one basis, through an opening in the turntable plate to a presentation position. The claw-arm includes opposed spring biased fingers for grasping each bearing presented by the carousel and for swinging the bearing into position above a ram. The claw-arm is designed to self-tighten about the grasped bearing as the arm is rotated to present the bearing to the ram. A qualifying device determines if the machine casting is in proper position and, if so, allows the ram to press the bearing into place.

6 Claims, 8 Drawing Figures

MACHINE COMPONENT INSTALLATION DEVICE

BACKGROUND OF THE INVENTION

The present invention relates to machinery, and, more particularly, to machinery for automatically installing various machine components, such as bearings, into a casting, housing, or the like during an assembly process.

Various types of machines have been developed for the automatic installation of machine components, such as bearings, into a component accepting bore in a casting, housing, or like part. For example, in the manufacture of small compressors, a machine casting is provided with bearing-accepting bores into which bearings are press fitted. While installation of the bearing can be effected manually, various types of component loading and pressing devices have been developed. It is known, for example, to maintain a supply of stacked bearings in a hopper and to use a linearly reciprocatable slide to push or 'strip out' the lowermost bearing from the stack and move the stripped out bearing to a position where it can be inserted into its bore by a press. While machines of this type are generally suited for their intended function, such installation devices are typically designed to accommodate the dimensions of a specific component and, accordingly, are best suited to high volume production situations where change-over from one sized component to another is not required. Thus prior devices are generally not suited to low or medium volume production runs or situations where differently sized components must be installed, since their initial design and fabrication costs cannot be justified. In addition, prior devices are oftentime relatively large, making them difficult to integrate into flexible machine systems where compact machining and assembly stations are a desirable feature.

SUMMARY OF THE INVENTION

In view of the above, it is an object of the present invention, among others, to provide a machine for installing machine components which can be quickly changed over from one type of component to another with a minimum of down time and minimum investment when new parts are added.

It is another object of the present invention to provide a machine for installing machine components which is relatively compact compared to prior designs.

It is another object of the present invention to provide a machine for installing machine components in which a large supply of the components to be installed can be maintained to minimize the time demands of the machine operator.

In view of these objects, and others, the present invention provides a rotatably mounted carousel type component feeder for accepting at least two, and preferably more, stacks of the machine components to be installed, a claw-arm for grasping the machine components presented by the component feeder and for moving the so-grasped components to a press for installation. The press includes a part position qualifier for determining if a machine casting or housing, into which the component is to be pressed, is in proper position before allowing a ram to press the machine component into place.

In the preferred embodiment, the component feeder includes a turntable mounted on a horizontally aligned base plate for incremental rotation about the vertical axis. The turntable includes guides that accept stacks of the machine components, typically bearings, above a discharge opening associated with each stack. A stationary sub-plate, mounted below the turntable, includes a shelf onto which the machine components drop on a one-by-one basis from the respective stack. A transfer arm is pivoted at one end to a control shaft and includes a spring biased claw at its opposite end for grasping bearings presented by the component feeder. The claw includes first and second spring biased members that grasp a bearing and hold the bearing as the transfer arm is pivoted to transfer the bearing to a press position above a fluid actuated ram and below the bearing receiving bore of a machine casting or the like. A qualifying fixture determines that the machine casting is in its proper position and then allows the fluid actuated ram to press the bearing held in the claw into its receiving bore to complete the installation process. The axial position of the installed bearing can be accurately determined by providing a shoulder in the receiving bore against which the bearing is pushed, by providing an accurately located stop on the qualifying fixture, or by limiting the stroke of the fluid actuated ram to a predetermined dimension. When the components in a stack are exhausted, the component feeder is rotated to bring another stack of components into position for installation on a one-by-one basis.

The component feeder is detachably mounted to the base plate and can be readily removed for replacement with another component feeder designed to accommodate differently sized components and to thus allow rapid change-over with a minimum of downtime. Since each component feeder accommodates at least two and preferably more component stacks, the time interval between which a machine operator must replenish the component supply is desirably extended. The use of a pivotally mounted claw arm, in contrast to the prior reciprocating slide mechanisms, decreases the overall size of the component installation device with increased operational efficiency.

A principal objective of the present invention is, therefore, the provision of an improved machine component installing device which is straightforward in operation and which tests the position of the parts before attempting installation. Other objects and further scope of applicability of the present invention will become apparent from the detailed description to follow, taken in conjunction with the accompanying drawings, in which like parts are designated by like reference characters.

DESCRIPTION OF THE PREFERRED EMBODIMENT

Figure 1:
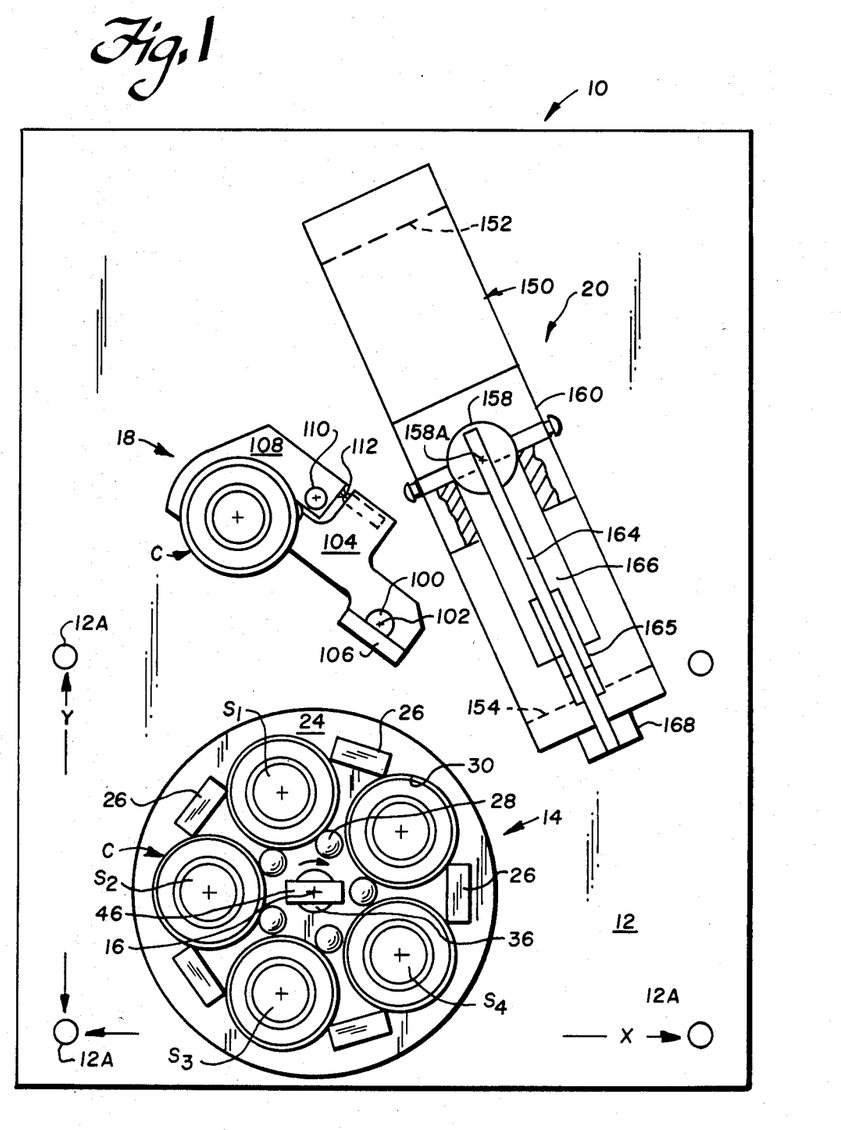
FIG. 1 is a plan view of a machine component installation device in accordance with the present invention.

A machine component installation device in accordance with the present invention is illustrated in plan view in FIG. 1 and designated generally therein by the reference character 10. As shown, the component installation device 10 includes a base plate 12 upon which a carousel-like rotary component feeder 14 is mounted for rotation about an axis 16 in the direction indicated, a transfer arm 18, shown in an intermediate position in FIG. 1, for grasping a component 'C' presented by the component feeder 14 and transferring the grasped component 'C' to a pre-installation position, and a press 20 for installing the component 'C' into a component receiving casting, as described more fully below. The base plate 12 is provided with mounting holes 12A that are spaced apart from one another by 'X' and 'Y' dimensions. In the preferred application of the present invention, the disclosed structure is part of a tooling module for installation on an integrated process machine having work station positions with mounting structures that accept tooling modules having the X-Y dimension scheme described above. One such machine is disclosed in applicant's co-pending U.S. patent application Ser. No. 06/881,236, filed July 2, 1986 and entitled "Modularly Expandable Integrated Process Machine System."

In the disclosed embodiment, the component 'C' is in the form of an anti-friction bearing that is pressed into a bearing receiving bore in a machined casting as part of an assembly operation, as described more fully below. As can be appreciated, other cylindrical and non-cylindrical components including plugs, pins, seals and the like can be installed using the apparatus of the present invention.

Figure 2:
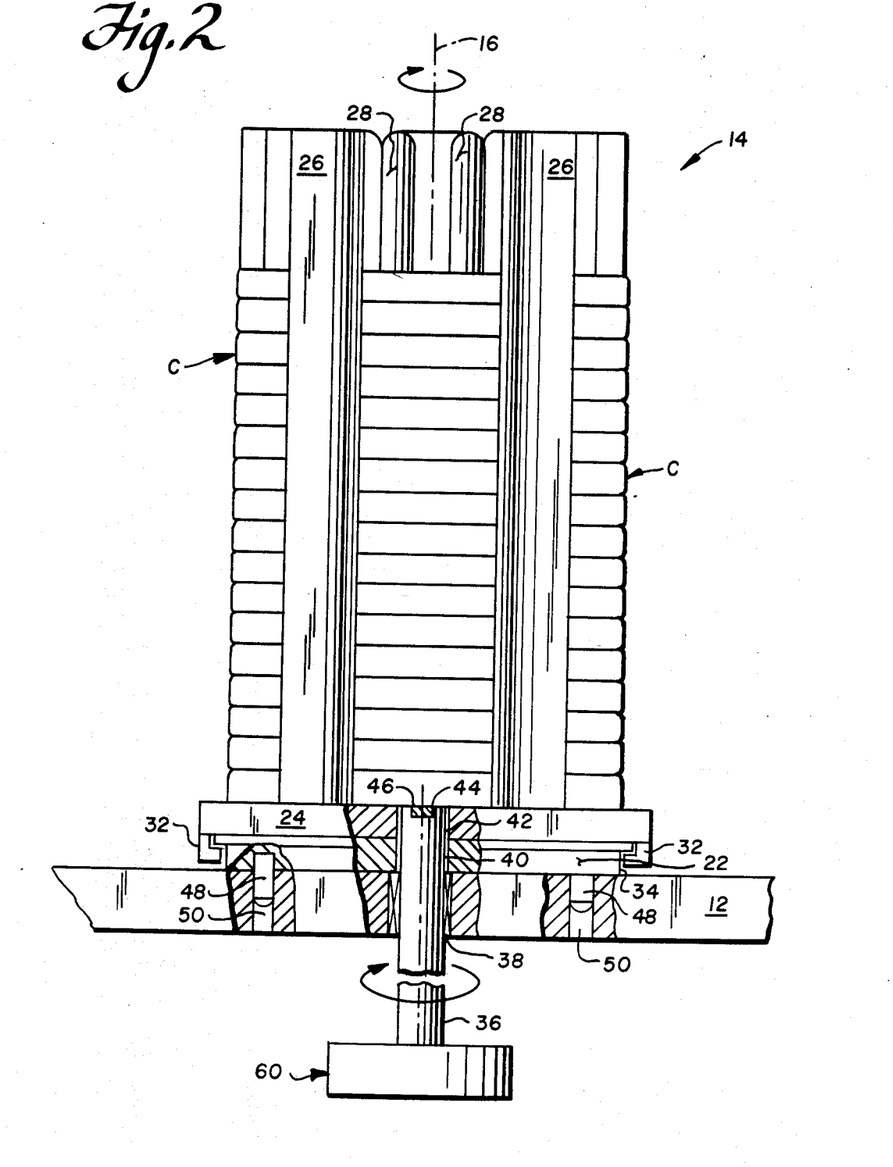
FIG. 2 is a side elevational view, in partial cross section, of a component feeder shown in FIG. 1.

As shown in plan view in FIG. 1 and side elevational view in FIG. 2, the component feeder 14 includes a sub-plate 22 detachably attached to the base plate 12 and a turntable 24 mounted atop the sub-plate 22. A plurality of guide bars 26, having a generally rectangular cross-section, and guide rods 28, having a generally circular cross-section, are secured at their lower ends to the upper surface of the turntable 24 and extend upward therefrom. As shown in FIG. 1, the guide bars 26 and guide rods 28 define restraining surfaces for five columns or stacks $S_1$, $S_2$, $S_3$, $S_4$, and $S_5$. In FIG. 1, the stack $S_1$ is shown in an 'active' position, that is, the position in which the components 'C' are available on a one-by-one basis for the assembly cycle. Circular openings 30 are provided in the turntable 24 so that stacked components 'C' can readily drop through onto a surface of the sub-plate 22, as described more fully below. The turntable 24 is connected to the sub-plate 22 for relative rotation by depending edge guides 32 which cooperate with a reduced diameter surface 34 of the sub-plate 22 so as to prevent axial separation of the sub-plate 22 from the turntable 24 while allowing one to rotate relative to the other. A drive shaft 36, carried in a bearing 38 mounted in the base plate 12, extends upwardly through a clearance bore 40 in the sub-plate 22 and another bore 42 in the turntable 24. The upper end of the drive shaft 36 is provided with a diametrically aligned key slot 44 that accepts and engages with a key 46 secured to the turntable 24 to provide a torque transmitting connection between the drive shaft 36 and the turntable 24. The sub-plate 22 is restrained from rotation relative to the base plate 12 by pins 48 secured to the lower surface of the sub-plate 22 and which extend into pin-accepting bores 50 formed in the base plate 12. The organization of the parts is such that the entire component feeder 14 can be manually lifted off the base plate 12 with the drive shaft 36 disengaging from the key 46 and the pins 48 disengaging from the bores 50. The detachable nature of the component feeder 14 allows relatively quick changing of the component feeder 14 for components 'C' of different sizes and characteristics. Accordingly, re-tooling costs are minimized since the base plate 12 and many of the parts and mechanisms are retained even though components 'C' of different sizes and characteristics are being installed.

Figure 3:
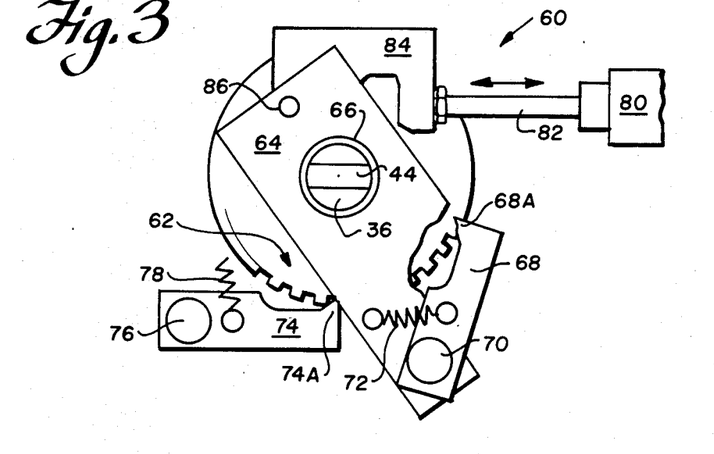
FIG. 3 is a plan view of a rotary incrementing device for rotating the component feeder shown in FIGS. 1 and 2.

The drive connection between the drive shaft 36 and the turntable 24 is such that rotation of the drive shaft 36 will cause a corresponding rotation of the turntable 24 relative to the sub-plate 22. In the preferred embodiment, the drive shaft 36 is driven by a pawl and ratchet mechanism, indicated generally in FIG. 3 by the reference character 60, in 72° increments to successively present the various stacks $S_1, \ldots, S_5$ to the active position in which the lowermost component 'C' can be removed or stripped from the bottom of the active stack $S_n$ by the transfer arm 18, as explained more fully below. As shown in FIG. 3, the pawl and ratchet mechanism 60 includes a toothed ratchet 62 secured to the drive shaft 36 for rotation therewith. A carrier plate 64 is journalled to the drive shaft 36 through a bearing 66 and carries a pawl 68 for engagement with the ratchet 62. The pawl 68 is pivoted at one end by a pin 70 and has a tooth 68A at the opposite end that engages the periphery of the ratchet 62. A spring 72, in tension, extends between mounting pins (unnumbered) on the pawl 68 and the carrier plate 64 and biases the pawl 68 into engagement with the ratchet 62. A second pawl 74 is pivotally mounted on a suitable bracket (not specifically illustrated) through a post 76 and includes a tooth 74A resiliently biased into engagement with the ratchet 62 by a spring 78. A selectively controlled bidirectional actuator 80, preferably in the form of a hydraulic or pneumatic cylinder (partially illustrated), includes a control rod 82 coupled to the carrier plate 64 through a connecting link 84. A pin 86 pivotally connects the carrier plate 64 to the connecting link 84. In operation, the actuator 80 is selectively reciprocated through an operating stroke to incrementally rotate the drive shaft 36. As the control rod 82 is moved leftward, the carrier plate 64 and the pawl 68 are driven counterclockwise. The tooth 68A of the pawl 68 likewise rotates the ratchet 62 through the desired increment. As the control rod 82 is driven rightward, the pawl 74 maintains the rotated ratchet 62 in its incremented position. As can be appreciated, the magnitude of the rotary increment can be selectively varied by controlling the stroke of the connecting link 82 in embodiments having a greater or lesser number of stacks than that illustrated, and other mechanisms and devices can be used to likewise effect incremental rotation of the drive shaft 36 and connected component feeder 14.

Figure 4:
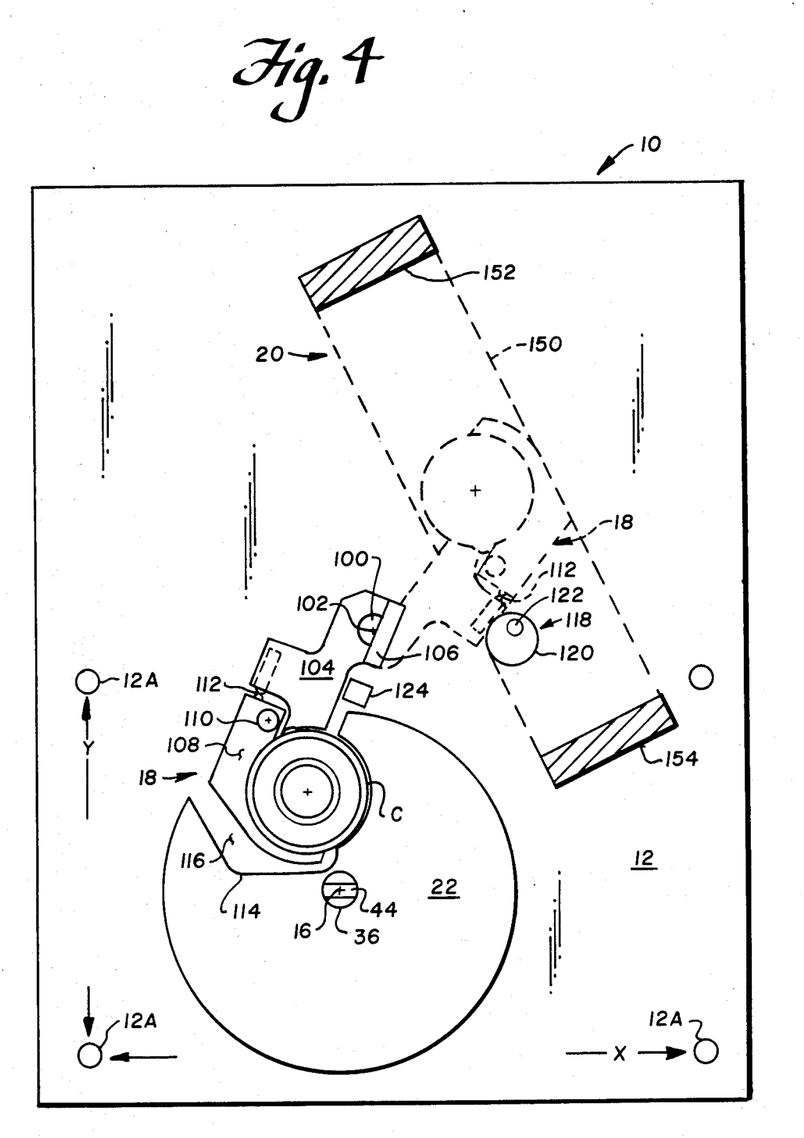
FIG. 4 is a plan view of a transfer arm engaging a component located on a sub-plate of the component feeder in which selected parts have been omitted for reasons of clarity.

The transfer arm 18, as shown in FIG. 4, is mounted on a control shaft 100 that extends upwardly from the base plate 12 for controlled rotation about an axis 102. The transfer arm 18 includes a first member 104 secured to the control shaft 100 by a clamping plate 106 and a finger-like second member 108 pivotally connected to the first member 104 by a pin 110. A spring 112, in compression, is received in a bore (unnumbered) formed in the first member 104 and resiliently urges the second member 108 counterclockwise about the pin 110. The first and second members, 104 and 108, are dimensioned to 'snap' over and grasp a component 'C' beneath the active component stack $S_n$ and transfer the grasped component 'C' to a pre-installation position in the press 20, as indicated generally in broken line illustration. As shown in the side elevational view of FIG. 5, the sub-plate 22 is provided with a reduced thickness area, indicated generally by the contour 114 in FIG. 4, to define a ledge or shelf 116 upon which the lowermost component 'C' in the active stack $S_n$ rests for grasping by the transfer arm 18 as it is pivoted counterclockwise. As the first and second members, 104 and 108, contact the component 'C', the spring 112 yields somewhat to allow the second member 108 to pivot relative to the first member 104 to pass around the component 'C' and thus allow the first and second members to effectively grip the component 'C' as it rests upon the shelf 116. In general, it is preferred that the first and second members, 104 and 108, subtend or grip 180° or more of the circumference of the component 'C' to provide a self-tightening grip in a manner analogous to a pipe wrench. Thus, any attempt to pull the component 'C' from the grasp of the first and second members 104 and 108 will cause the first and second members to tighten the grip about the component 'C'.

After the component 'C' is grasped by the first and second members, 104 and 108, the transfer arm 18 is then controlled to rotate clockwise in FIG. 4 to the broken line position with the end-of-movement position controlled by a user adjustable stop 118. In the preferred form, the stop 118 includes an eccentrically mounted disc 120 secured to the base plate 12 by a threaded fastener 122. The organization of the first and second members 104 and 108 is such that the acceleration forces applied to the component 'C' as it is rotated clockwise about the axis 102 causes the second member 108 to grip the component 'C' with a proportionately greater gripping force. The gripped component 'C' can thus be subjected to relatively high accelerations consequent to high-speed operating cycles with minimal risk of the component 'C' becoming disengaged from the transfer arm 18. The transfer arm 18 thus successively operates between its solid and broken line positions in FIG. 4 transporting the lowermost component 'C' on the shelf 116 below the active stack $S_n$ to the broken line position for installation by the press 20. An over travel switch 124, discussed in more detail in relation to FIG. 8, senses when the transfer arm 18 travels beyond the normal position in which a component 'C' is grasped, the condition occurring when the supply of components 'C' in a stack $S_n$ is exhausted.

Figure 5:
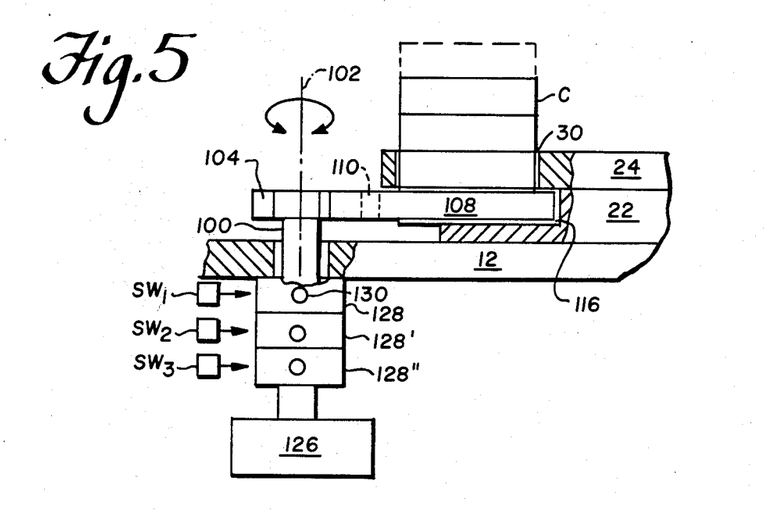
FIG. 5 is a side view of the transfer arm of FIG. 4 taken along line 5—5 of FIG. 4.

As shown in FIG. 5, the control shaft 100 is connected to a rotary actuator 126, such as a rotary solenoid, that is selectively controlled to move the transfer arm 18 through its operating stroke. A plurality of collars 128, 128' and 128" are mounted on the control shaft 100 and include detents, represented at 130, that cooperate with switches $SW_1$, $SW_2$, and $SW_3$ for determining the position of the control shaft 100 and transfer arm 18.

Figure 6:
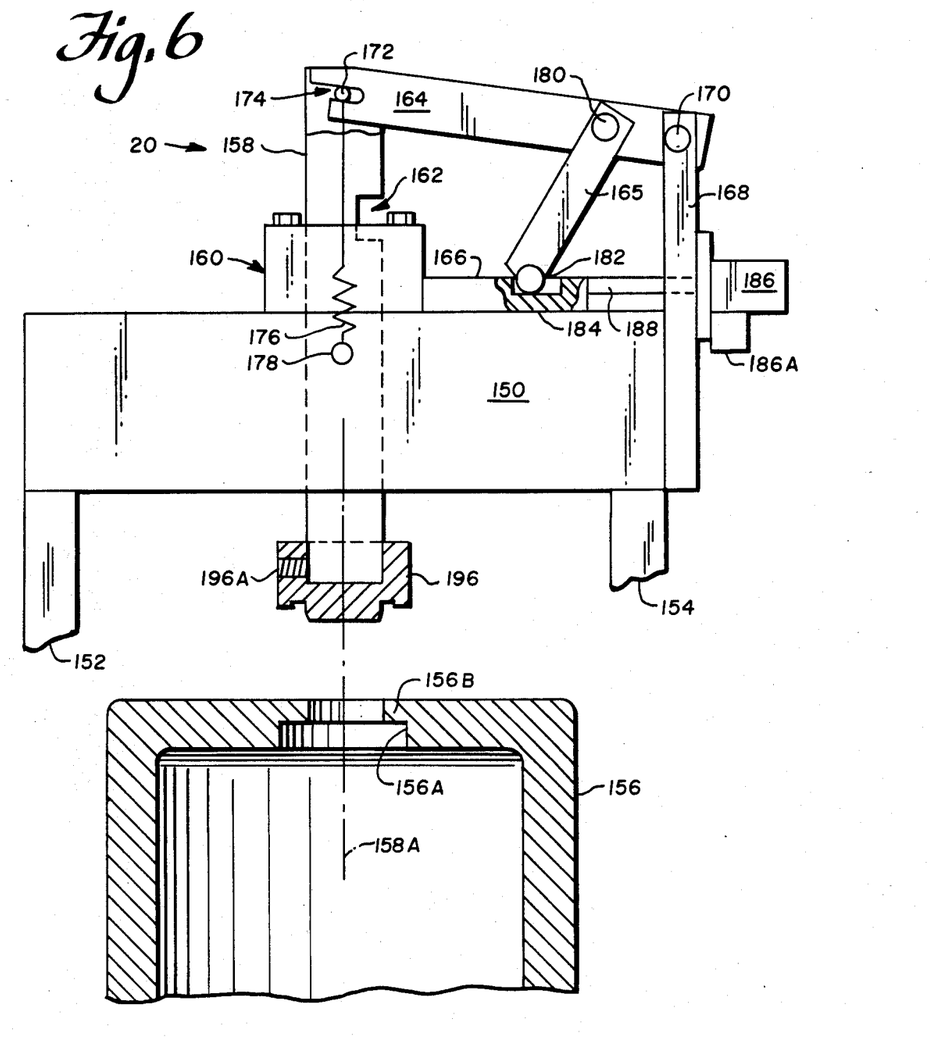
FIG. 6 is a side view of the upper portion of a component installation press showing a qualifying fixture in an upper position.
Figure 7:
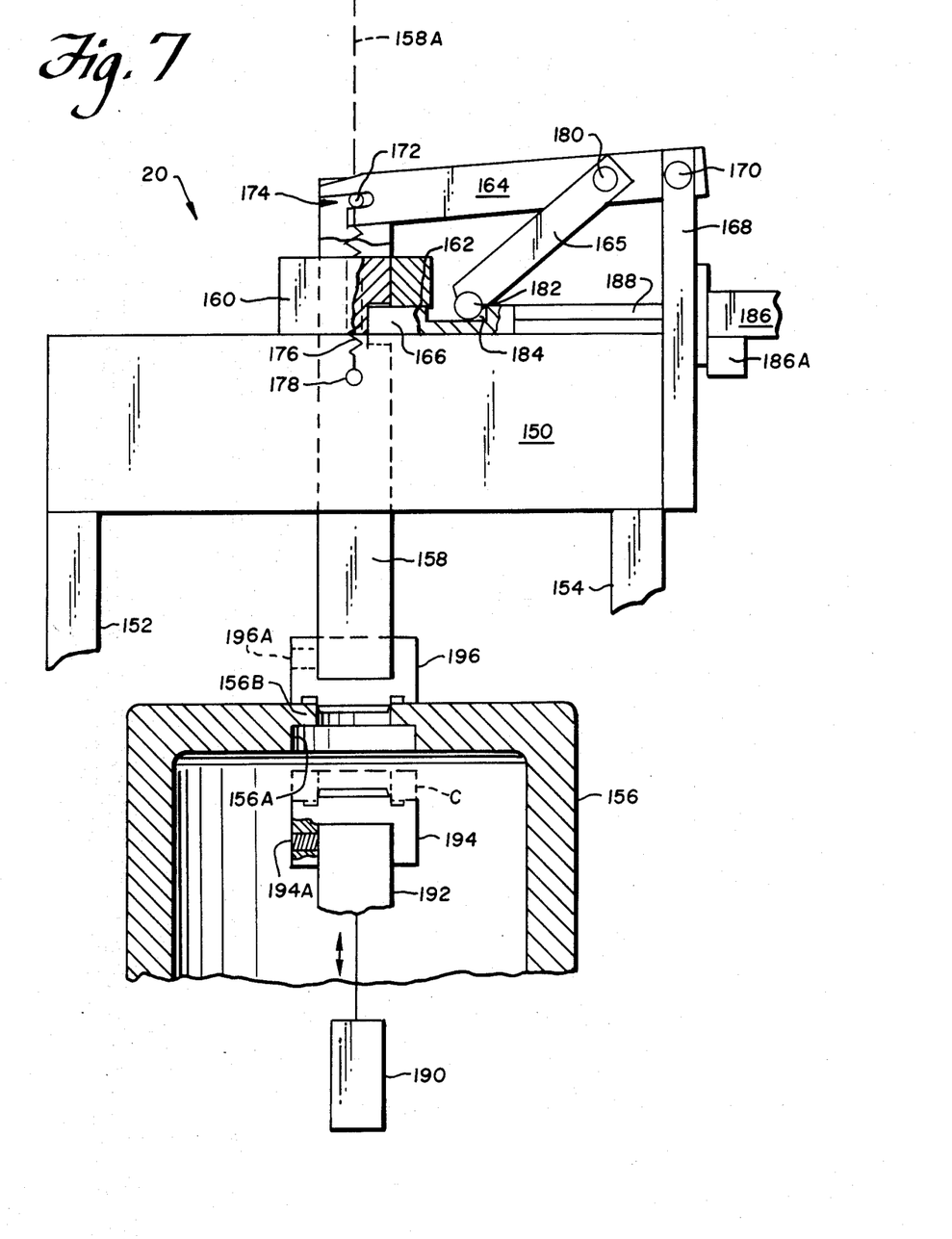
FIG. 7 is a side view of the upper portion of the component installation press shown in FIG. 6 showing the qualifying fixture in a lower position.

The component installing press 20, shown in plan view in FIG. 1 and in partial side elevational view in FIGS. 6 and 7, includes an upper support plate 150 carried on vertical posts 152 and 154 a selected distance above the base plate 12. A qualifying and reaction assembly is mounted from the support plate 150 for determining when a component 'C' receiving casting 156 (indicated generally) is properly positioned to receive the component 'C' held by the transfer arm 18. The qualifying and reaction assembly includes a qualifying bar 158 mounted for sliding movement in the vertical direction along an axis 158A in clearance bores formed in the support plate 150 and a reaction collar 160 mounted atop the support plate 150. The qualifying bar 158 includes a transverse notch 162 formed on one side for locking the qualifying bar 158 at a selected position above the base plate 12, as explained below.

The movement and positioning of the qualifying bar 158 is controlled by a linkage mechanism which includes a support link 164, a lift link 165, a lock slide 166, and a bracket 168. The support link 164 is pivotally connected at one end to the bracket 168 by a pin 170 and at its opposite end to the qualifying bar 158 by a pin 172 secured to the qualifying bar 158 and engaging an open-ended slot 174 formed in the support link 164. One or more coil springs 176 (illustrated in schematic form) are connected to the pin 172 and another pin 178 secured to the support plate 150 to resiliently urge the qualifying bar 158 downward. Although springs are preferred, gravity or other arrangements can be used to lower the qualifying bar 158 downward. The lock slide 166, which has a generally rectangular cross section, is positioned on the top surface of the support plate 150 for sliding movement between a retracted positioned, illustrated in FIG. 6, and an advanced position, illustrated in FIG. 7, in which the lock slide 166 passes through an appropriately sized clearance opening in the reaction collar 160 into the notch 162 in the qualifying bar 158 to lock the qualifying bar 158 in a selected position. The lift link 165 is pivotally connected at one end to the support link 164 through a pivot pin 180 and to the lock slide 166 at its opposite end by a roller 182 received in slot 184 formed in the lock slide 166. The slot 184 has a width somewhat wider than the diameter of the roller 182 to provide a lost motion connection between the two that, along with the open ended slot 174 in the support link 164, allows the qualifying bar 158 to be freely moved between raised (FIG. 6) and lowered positions (FIG. 7). A bidirectional actuator 186, preferably of the hydraulic or pneumatic type, is mounted to the bracket 168 and includes a control rod 188 connected to the lock slide 166. As can be appreciated, the lock slide 166 can be moved to the right by the actuator 186 to withdraw from the notch 162 and cause the lift link 165 to raise the support link 164 and qualifying bar 158 to a raised position. Conversely, movement of the lock slide 166 to the left by the actuator 186 will lower the support link 162 and the qualifying bar 158 and allow the lock slide 166 to enter the notch 162 when the parts are properly aligned. As explained below, locking of the qualifying bar 158 can only be achieved when the qualifying bar 158 is properly positioned by a casting or similar part into which the component 'C' is to be installed.

As shown in schematic form in FIG. 7, a bidirectional actuator 190, in the form of a hydraulic or pneumatic cylinder, is mounted below the base plate 12 and includes a ram 192 that is extendable upwardly on the same axis 158A as the qualifying bar 158. A nose piece 194 is mounted at the end of the ram 192 and held in place by a set screw 194A, and another nose piece 196 is mounted at the bottom end of the qualifying bar 158 and held in place by a set screw 196A. The nose pieces 194 and 196, as well as the housing 156, include surface contours adapted to the structure of the particular component 'C' involved.

In the preferred embodiment, the structure of the present invention is used to insert anti-friction bearings in a bearing receiving bore of a machined casting that constitutes a sub-assembly for fabrication of a final product, for example, an air compressor. In FIG. 6, an exemplary casting 156 includes an appropriately sized bore 156A into which the component 'C' is pressed by the ram 192 and a shoulder 156B which determines the final axial position of the component 'C'. In operation, the casting 156 is transported to a position beneath the support plate 150 and between the vertical posts 152 and 154 with the bore 158A aligned beneath the nose piece 196 of the qualifying bar 158 and above the nose piece 194 of the ram 192. As can be appreciated, the manner in which the casting 156 is transported is a function of the particular casting configuration and of the equipment upon which the machine component installation device 10 is mounted or otherwise associated. In general, castings 156 can be mounted on fixturing posts, ledges, or shelves (not shown) connected to the base plate 12 or the vertical posts 152 and 154, depending upon the structure of the casting 156 with the mounting arrangement allowing sufficient clearance for the operation of the transfer arm 18. In addition, and as disclosed in applicant's above referenced co-pending U.S. patent application Ser. No. 06/881,236 filed July 2, 1986, pallets specially adapted to the particular configuration of the casting 156 are used to position the casting with the component 'C' receiving bore 156A below the qualifying bar 158.

Figure 8:
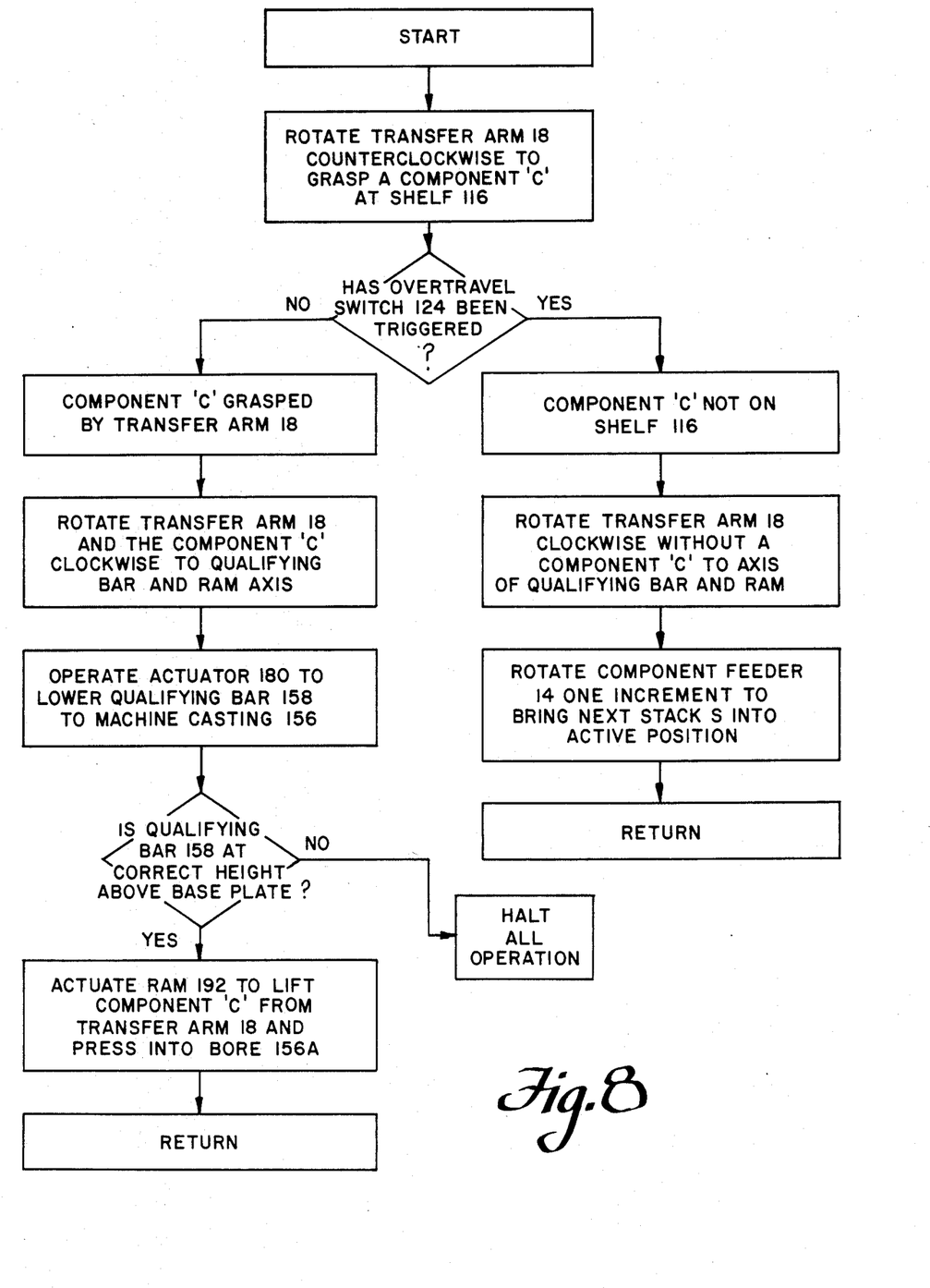
FIG. 8 is a flow diagram illustrating the operation of the structure shown in FIGS. 1–7.

The operating sequence of the machine component installing device 10 is shown in FIG. 8 in flow diagram form. As shown, the transfer arm rotary actuator 126 is controlled to rotate the transfer arm 18 counterclockwise to grasp a component 'C' positioned on the shelf 116 of the sub-plate 22, this component 'C' being the lowermost component 'C' in the active stack $S_n$ of the component feeder 14. A query is presented so to whether or not the overtravel switch 124 has been triggered. If the overtravel switch 124 has not been triggered, indicating that the component 'C' has been grasped, the transfer arm 18 rotary actuator 126 is commanded to rotate the grasped component 'C' into position below the qualifying bar 158 with the motion of the transfer arm 18 controlled and limited by the adjustable stop 118. With the component 'C' positioned by the transfer arm 18 below the qualifying bar 158 and above the ram 192, the actuator 186 is operated to drive the lock slide 166 to the left allowing the qualifying bar 158 to descend toward the machined casting 156. If the machine casting 158 is properly aligned beneath the qualifying bar 158, the nose piece 196 will engage precisely the bore 158A with the notch 162 located at the correct position to allow the lock slide 166 to enter the notch 162 and positionally secure the qualifying bar 158 at the correct elevation. Conversely, if the casting 158 is not at the correct elevation because, for example, it is skewed, tilted, or otherwise incorrectly mounted, the qualifying bar 158 will be either above or below its lockable position and the lock slide 166 will fail to enter the notch 162 to lock the qualifying bar 158 in position. A switch 186A associated with the actuator 180 senses the position of the control rod 188 and attached lock slide 166 and provides an indication as to whether the lock slide 166 is in proper position or not. Where a failure to lock is detected, the switch 186A provides a signal to cease all operations. Where the switch 186A indicates a successful locking of the qualifying bar 158, the actuator 190 is controlled to advance the ram 192 upward. As the ram 192 rises, its nose piece 194 contacts the component 'C' being grasped by the transfer arm 18 and lifts the component 'C' out of engagement with the transfer arm 18. The ram 192 carries the component 'C' upwardly to press the component 'C' into the bore 158A. The ram 192 is then retracted to its initial position, and the transfer arm rotary actuator 126 again operated to rotate counterclockwise to grasp the next component 'C' presented on the loading shelf 116 of the sub-plate 22. In the event a component 'C' is not present on the loading shelf, that is, all the components 'C' in the active stack $S_n$ were used, the transfer arm 18 pivots beyond its component grasping position to contact the overtravel switch 124 to initiate a sub-routine that increments the component feeder 14 to bring the next available component 'C' stack $S_{n+1}$ into the active position. As shown on the right in FIG. 8, the transfer arm 18 is pivoted, without a component 'C', clockwise to its usual position below the qualifying bar 158. The actuator 80 (FIG. 3) is then operated to rotate the drive shaft 36 and the connected component feeder 14 to bring the next available component 'C' stack $S_{n+1}$ *into the active position with the lowermost component 'C' dropping onto the loading shelf 116. As shown in FIG. 8, the operating sequence then restarts to repeat the sequence in a recurring manner. As a stack $S_n$ is exhausted* and a new stack $S_{n+1}$ brought into the active position, the now-empty stack position is available for reloading by the machine operator.

As can be appreciated, the machine component installing device of the present invention allows for the efficient installation of machine components in a compact device that can be readily changed-over from one size component to another by merely removing and replacing the component feeder 14 and the nose pieces 194 and 196 and, depending upon the circumstances, the transfer arm 18.

Thus it will be appreciated from the above that as a result of the present invention, a highly effective machine component installation device is provided by which the principal objective, among others, is completely fulfilled. It will be equally apparent and is contemplated that modification and/or changes may be made in the illustrated embodiment without departure from the invention. Accordingly, it is expressly intended that the foregoing description and accompanying drawings are illustrative of preferred embodiments only, not limiting, and that the true spirit and scope of the present invention will be determined by reference to the appended claims.

What is claimed is:

1. A machine component installation device comprising:
   a component feeder rotatably mounted on a base plate for controlled rotation about an axis, said component feeder having at least two stacks of components to be installed, each stack selectively positionable at an active position;
   a transfer arm mounted on said base plate for movement between first and second positions, said transfer arm including first and second pivotally connected members for grasping a component presented at said first position by said component feeder and for pivoting motion to the second position; and a component installation press having a ram operable along an installation axis substantially coincident with the second position, said ram operable to advance along the installation axis to carry a component grasped by said transfer arm.

2. The machine component installation device of claim 1, wherein said component feeder comprises:

a turntable having guide means for defining plural stacks of components, said turntable have respective opening associated with each stack through which the lowermost component of each stack may pass;

a sub-plate mounted below said turntable and having a surface upon which the lowermost component of the stack at the active position may drop; and means connected to said turntable for effecting rotation thereof to selectively bring each of said stacks to said active position.

3. The machine component installation device of claim 1, wherein said first and second members of said transfer arm are pivotally connected to one another and further comprising means for resiliently biasing said second member toward said first member to allow grasping of a component.

4. The machine component installation device of claim 3, further comprising:

rotary drive means connected to said transfer arm for alternatively pivoting said transfer arm to said first position to grasp a component presented by said component feeder and transporting said component to said second position.

5. The machine component installation device of claim 4, wherein said first and second members grasp a component with a greater force as the transfer arm is rotated from the second to the first position.

6. The machine component installation device of claim 1, wherein said press comprises:

a qualifying bar selectively moveable along said installation axis to a predetermined position relative to said base plate, said qualifying bar including a notch engagable with a position locking device when said qualifying bar is at said predetermined position and not engagable therewith when said qualifying bar is at a position other than said predetermined position.

* * * * *